US006944731B2

(12) United States Patent
Bouchard et al.

(10) Patent No.: US 6,944,731 B2
(45) Date of Patent: Sep. 13, 2005

(54) DYNAMIC RANDOM ACCESS MEMORY SYSTEM WITH BANK CONFLICT AVOIDANCE FEATURE

(75) Inventors: Gregg A. Bouchard, Round Rock, TX (US); Mauricio Calle, Austin, TX (US); Ravi Ramaswami, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 536 days.

(21) Appl. No.: 10/025,331

(22) Filed: Dec. 19, 2001

(65) Prior Publication Data

US 2003/0115403 A1 Jun. 19, 2003

(51) Int. Cl.[7] .............................................. G06F 12/00
(52) U.S. Cl. .......................... 711/161; 711/5; 711/105; 711/154; 711/201; 710/6; 710/112; 710/310; 370/363; 370/382; 370/389; 370/400; 370/408; 370/412
(58) Field of Search ............................ 711/5, 105, 154, 711/161, 201; 710/6, 112, 310; 370/363, 382, 389, 400, 408, 412

(56) References Cited

U.S. PATENT DOCUMENTS 4,766,535 A * 8/1988 Auerbach et al. ........... 711/165
4,912,698 A * 3/1990 Bitzinger et al. ........... 370/244
6,108,243 A * 8/2000 Suzuki et al. ........... 365/189.01
6,308,219 B1 * 10/2001 Hughes ....................... 709/238
6,430,527 B1 * 8/2002 Waters et al. .................. 703/3
6,636,445 B2 * 10/2003 Ohshima et al. ............ 365/190

OTHER PUBLICATIONS

Davis et al., The New DRAM Interfaces; SDRAM, DRDRAM amd Variants, Oct. 2000, High Performance Computing, 3rd ed. Int Symp.*

Sato et al., Fast Cycle RAM (FCRAM); a 20-ns Random Row Access, Pipe-Lined Operating DRAM, 1998, Symp. on VLSI Circuits Digest of Technical Papers.*

* cited by examiner

Primary Examiner—Donald Sparks
Assistant Examiner—Bao Q Truong

(57) ABSTRACT

A memory system having multiple memory banks is configured to prevent bank conflict between access requests. The memory system includes a memory controller and a plurality of memory banks operatively coupled to the memory controller, with each of the memory banks configured for storing a plurality of data items. More particularly, a given data item is stored as multiple copies of the data item with the multiple copies being stored in respective ones of a designated minimum number of the memory banks. The memory controller is adapted to process requests for access to the data items stored in the memory banks in accordance with a specified bank access sequence.

18 Claims, 4 Drawing Sheets

DYNAMIC RANDOM ACCESS MEMORY SYSTEM WITH BANK CONFLICT AVOIDANCE FEATURE

FIELD OF THE INVENTION

The present invention relates generally to memories for use in conjunction with network processors and other processing devices, and more particularly to a memory architecture configured for avoidance of conflict between multiple memory banks.

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Dynamic random access memories (DRAMs) are a preferred storage technology for use in conjunction with such network processors, in that DRAMs can provide a large storage capacity at a limited power consumption.

DRAMs within or otherwise associated with a network processor are typically arranged in the form of multiple memory banks. Consecutive read or write accesses to an address or addresses within a given one of the banks will require waiting a random cycle time Trc for completion of a required access pre-charge process. However, consecutive accesses to even the same address within different banks do not experience this Trc wait time, which is also referred to herein as the bank conflict penalty.

Static random access memories (SRAMs) avoid the bank conflict penalty altogether. That is, any address in the memory can be accessed in a fixed time without incurring the Trc wait time associated with DRAMs. The drawback of SRAMS, however, is that their storage capacity is typically an order of magnitude lower, and their power consumption is typically two orders of magnitude higher, relative to comparably-sized DRAMs.

A number of DRAMs known in the art are specifically configured to reduce the Trc wait time described above. For example, a so-called fast cycle DRAM (FCDRAM) is particularly designed to exhibit a minimal Trc. A more particular example of an FCDRAM, commercially available from Toshiba, is identified by part number TC59LM814CFT-50. In this particular type of FCDRAM, the random cycle time Trc is limited to 5T, where T denotes the memory clock period. A memory access, either read or write, requires two clock periods, and maximum data throughput is achieved by using a so-called "four-burst" mode. For example, using a 200 MHz memory clock and an FCDRAM configured in four banks, with each of the banks including 4M memory words of 16 bits each, the memory clock period T is 5 nanoseconds and Trc is 25 nanoseconds, and the maximum data throughput using the four-burst mode is approximately 6.4 Gigabits per second (Gbps). However, if consecutive memory accesses go to the same one of the four banks, the data throughput is reduced to approximately 2.5 Gbps, as a result of the Trc wait time.

As is apparent from the foregoing, a need exists for an improved DRAM-based memory architecture, for use in conjunction with a network processor or other processing device, which can provide the storage capacity and low power consumption advantages of DRAMs while also providing the advantage of SRAMs in terms of avoiding the problems associated with the above-described bank conflict penalty.

SUMMARY OF THE INVENTION

The invention provides improved techniques for implementing DRAM-based memory suitable for use with a network processor or other processing device.

In accordance with one aspect of the invention, a memory system having multiple memory banks is configured to prevent bank conflict between access requests. The memory system includes a memory controller and multiple memory banks operatively coupled to the memory controller, with each of the memory banks configured for storing a plurality of data items. More particularly, a given data item is stored as multiple copies of the data item with the multiple copies being stored in respective ones of a designated minimum number of the memory banks. The memory controller is adapted to process requests for access to the data items stored in the memory banks in accordance with a specified bank access sequence, e.g., a round-robin sequence in which particular ones of the access requests are selected from head positions of a set of bank queues and applied to corresponding ones of the memory banks.

In an illustrative embodiment, the memory system is configured to include at least first and second memory channels, with each of the channels including a number of memory banks storing the same set of data items. The above-noted memory controller includes a first controller coupled to each of the first channel of memory banks via a first set of address, data and control buses, and a second controller coupled to each of the second channel of memory banks via a second set of address, data and control buses. The memory controller further includes a set of queues configured for storing the access requests, with each of the queues being associated with a corresponding one of the memory banks, and a memory access arbiter operatively coupled to the set of queues for selecting a given one of the access requests therefrom in accordance with the specified bank access sequence. The data throughput of a given embodiment may be increased by increasing the number of channels of the memory system.

In accordance with another aspect of the invention, the minimum number of memory banks for storage of the multiple copies of the given data item may be determined as a function of a random cycle time and a random bank access delay of the memory banks, e.g., as an integer greater than or equal to a ratio of the random cycle time to the random bank access delay.

In accordance with a further aspect of the invention, the memory system is preferably operable in the above-described bank conflict avoidance mode as well as a standard random access mode. The particular operating mode of the system may be selected under program control via a host processor or other associated device.

The memory system is particularly well-suited for use in memory applications in which there is an unbalanced read/write ratio, i.e., memory applications typically involving substantially more read accesses than write accesses. One such memory application is as an external tree memory for a network processor integrated circuit. The invention can also be used in numerous other processing device memory applications.

Advantageously, a memory system in accordance with the present invention can be configured to provide a maximum data throughput on the order of 10 Gbps or more.

DETAILED DESCRIPTION OF THE INVENTION

The invention will be illustrated herein in conjunction with an exemplary DRAM-based memory architecture particularly well-suited for use as an external memory in conjunction with a network processor. It should be understood, however, that the invention is more generally applicable to any processing device in which it is desirable to alleviate the above-described bank conflict penalty in multiple banks of internal or external random access memory.

The term "processing device" as used herein is intended to include, by way of example and without limitation, network processors, microprocessors, central processing units (CPUs), digital signal processors (DSPs), application-specific integrated circuits (ASICs), and other types of data processing devices, as well as portions and combinations of these and other devices.

The present invention in an illustrative embodiment avoids the above-described bank conflict penalty in a multiple-bank DRAM-based memory system associated with a network processor or other processing device by storing a specified number of identical data copies in different memory banks of the system. The minimum number of data item copies needed is determined in the illustrative embodiment as a function of the random cycle time Trc and the random bank access delay Trbd of the DRAM devices used. For example, the minimum number of data item copies for a given multiple-bank channel of the memory system is determined as an integer number greater than or equal to a ratio of Trc to Trbd, such that if Trc is 25 nanoseconds, and Trbd is 10 nanoseconds, the number of identical copies of a given data item to be stored in different banks is three.

Figure 1:
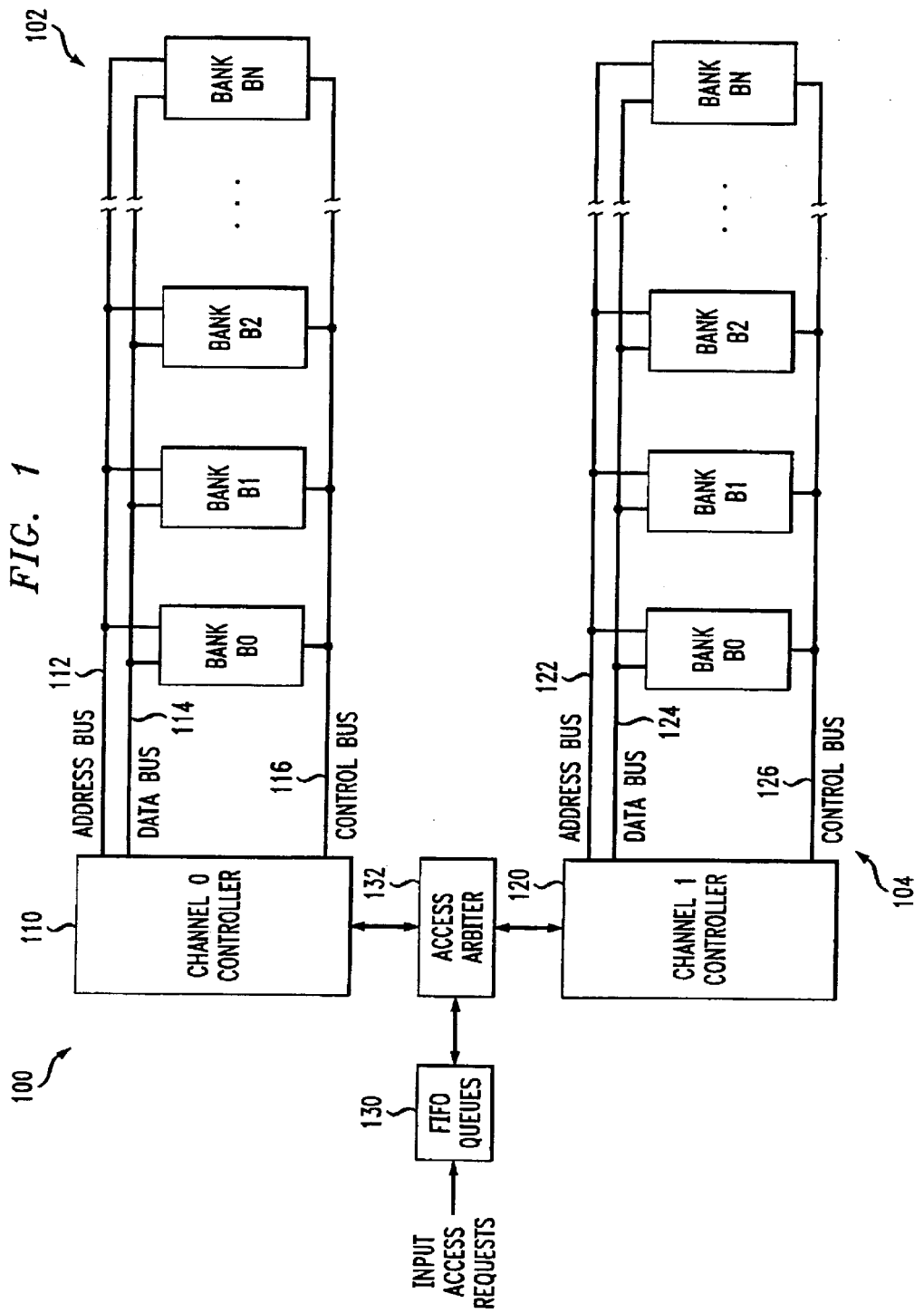
FIG. 1 shows a simplified block diagram of a memory system configured in accordance with the techniques of the invention.

FIG. 1 shows a memory system 100 configured in accordance with the invention. The memory system 100 includes a first channel 102, also referred to herein as Channel 0 or Ch0, and a second channel 104, also referred to herein as Channel 1 or Ch1. Each of the channels 102 and 104 includes a set of N memory banks, denoted as banks B0, B1 . . . BN. Channel 102 further includes a Channel 0 memory controller 110 coupled to each of its associated Channel 0 banks B0, B1, . . . BN via an address bus 112, a data bus 114, and a control bus 116 as shown. Similarly, channel 104 further includes a Channel 1 memory controller 120 coupled to each of its associated Channel 1 banks B0, B1, . . . BN via an address bus 122, a data bus 124, and a control bus 126. The memory system 100 further includes a set of input first-in first-out (FIFO) queues 130 and a memory access arbiter 132.

The memory system 100 may include decoder logic external to the memory banks, and such logic, although not shown in FIG. 1, can process be configured to process address and control bus signals in a conventional manner. A separate set of such decoder logic may be associated with each of the channels 102 and 104, and may be wholly or partially incorporated into the associated memory controller 110 or 120.

The memory banks B0, B1, . . . BN of channels 102 and 104 may each be implemented as one or more DRAM devices. For example, the memory banks may each be implemented as one or more of the fast cycle DRAM (FCDRAM) devices described previously. The manner in which such devices are configured is well-known in the art and will therefore not be described in further detail herein.

The present invention is particularly well-suited for use in memory applications in which there is an unbalanced read/write ratio, i.e., memory applications typically involving substantially more read accesses than write accesses. An example of an application with an unbalanced read/write ratio is an application having 95% read accesses and 5% write accesses. The invention does not require, however, any particular ratio of read and write accesses or type of unbalancing.

The controllers 110, 120, queues 130 and access arbiter 132 may be collectively viewed as a memory controller for the system 100. The term "memory controller" as used herein is therefore intended to be construed generally to encompass a single channel controller such as controller 110 or 120, or a more complex configuration including multiple channel controllers, as well as one or more arbiters, queues, or other related elements.

It should be understood that the particular configuration of memory system 100 as shown in FIG. 1 is by way of example only, and should not be construed as limiting the scope of the invention to any particular embodiment or group of embodiments. For example, although shown as including two channels each with N memory banks, those skilled in the art will appreciate that the invention can be implemented using more than two channels or only a single channel, and that in a given multiple-channel embodiment each channel need not have the same number of memory banks.

The data throughput of a given embodiment may be increased by increasing the number of channels of the memory system. In other words, the data throughput is proportional to the number of channels used.

In a bank conflict avoidance mode of operation, input access requests are directed to particular ones of the FIFO queues 130. These queues are preferably organized by bank, such that requests directed to a particular one of the Channel 0 or Channel 1 banks are stored within a particular FIFO queue associated with that bank in the set of FIFO queues 130. The memory access arbiter 132 then selects access requests from the FIFO queues 130 in accordance with a specified bank access sequence configured to prevent the previously-described bank conflict problem between access requests directed to different banks. Examples of this sequencing will be described in greater detail below.

It is assumed for purposes of illustration that each of the access requests to be stored in the FIFO queues 130 involves reading a particular data item from a specified address within a given one of the banks. The memory system 100 is configurable in accordance with the techniques of the present invention to be operable in the above-noted bank conflict avoidance mode. In this mode, a specified number of identical data copies are stored in different ones of the banks B0, B1, . . . BN, in each of the channels 102 and 104. As indicated previously, the minimum number of data item copies needed is determined in the illustrative embodiment as a function of the random cycle time Trc and the random bank access delay Trbd of the particular DRAM devices used in the Channel 0 and Channel 1 banks B0, B1, . . . BN. More particularly, the minimum number of the memory banks for storage of the multiple copies of a given data item is determined as an integer greater than or equal to a ratio of the random cycle time Trc to the random bank access delay Trbd. In the example given above, the minimum number of data item copies is determined as an integer number greater than or equal to a ratio of Trc to Trbd. Therefore, if the particular DRAM devices used have a Trc of 25 nanoseconds, and a Trbd of 10 nanoseconds, the number of identical copies of a given data item to be stored in different banks of a given memory channel is three.

Figure 2:
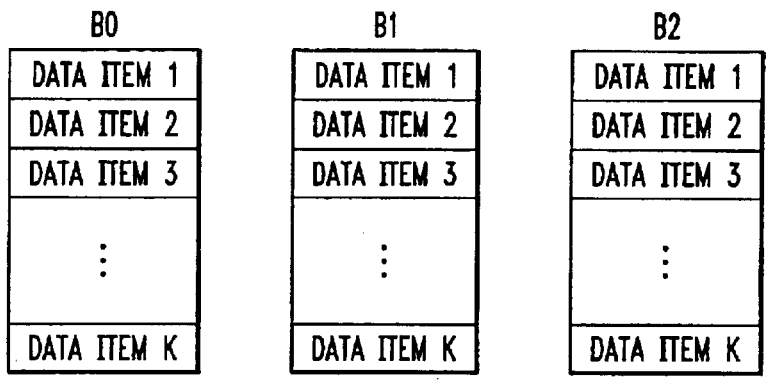
FIG. 2 illustrates the manner in which the same set of data items may be stored in multiple ones of the memory banks of the FIG. 1 memory system in a bank conflict avoidance mode in accordance with the invention.

FIG. 2 illustrates the maimer in which multiple copies of data items are stored in a designated minimum number of memory banks in the bank conflict avoidance mode. In this example, each of the banks B0, B1 and B2 of the N banks in a given channel stores the same set of K data items, denoted data item 1, data item 2, . . . data item K. Although only three banks are shown in the figure, it is assumed in the illustrative embodiment that the same storage configuration is utilized in both channel 102 and channel 104, such that a total of six banks out of the 2N total number of banks store the same set of data items. Each of the data items in this example corresponds to a particular addressable word of a memory bank. The above-noted input access requests are preferably directed to such addressable words within a particular one of the memory banks.

Figure 3:
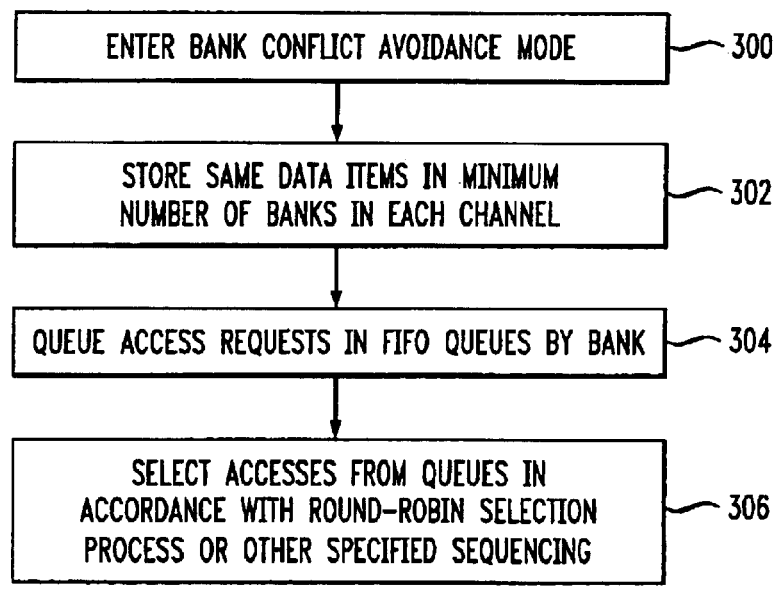
FIG. 3 is a flow diagram of a bank conflict avoidance process in accordance with the invention.

FIG. 3 is a flow diagram of a bank conflict avoidance process that may be implemented in the FIG. 1 system using the techniques of the invention. In step 300, the system enters bank conflict avoidance mode. This can be accomplished by programmable configuration of the controllers 110, 120, queues 130 and arbiter 132, as will be apparent to those skilled in the art.

Step 302 indicates that the same set of data items are then stored in the minimum number of banks in each channel, in the manner described previously. The minimum number of banks may be predetermined based on a given known memory system configuration, or may be dynamically determined using logic circuitry within the system memory controller. Once the system 100 is in the bank conflict avoidance mode and the multiple sets of data items have been stored in the memory banks in the manner previously described, the system 100 queues the input access requests in the set of FIFO queues 130 by bank, as indicated in step 304. The access requests are then selected from the FIFO queues 130 in accordance with a round-robin selection process or other specified bank access sequencing. For example, in a round-robin selection process, particular ones of the access requests are selected in a round-robin sequence from head positions of the sets of queues 130 and applied to corresponding ones of the memory banks. As a more particular example, the access requests may be selected based on the following bank access sequence pattern: Ch0-B0, Ch1-B0, Ch0-B1, Ch1-B1, Ch0-B2, Ch1-B2, Ch0-B0, Ch1-B0, and so on. Other combinations of channel and bank may be used in other bank access sequences suitable for use in accordance with the present invention.

Figure 4:
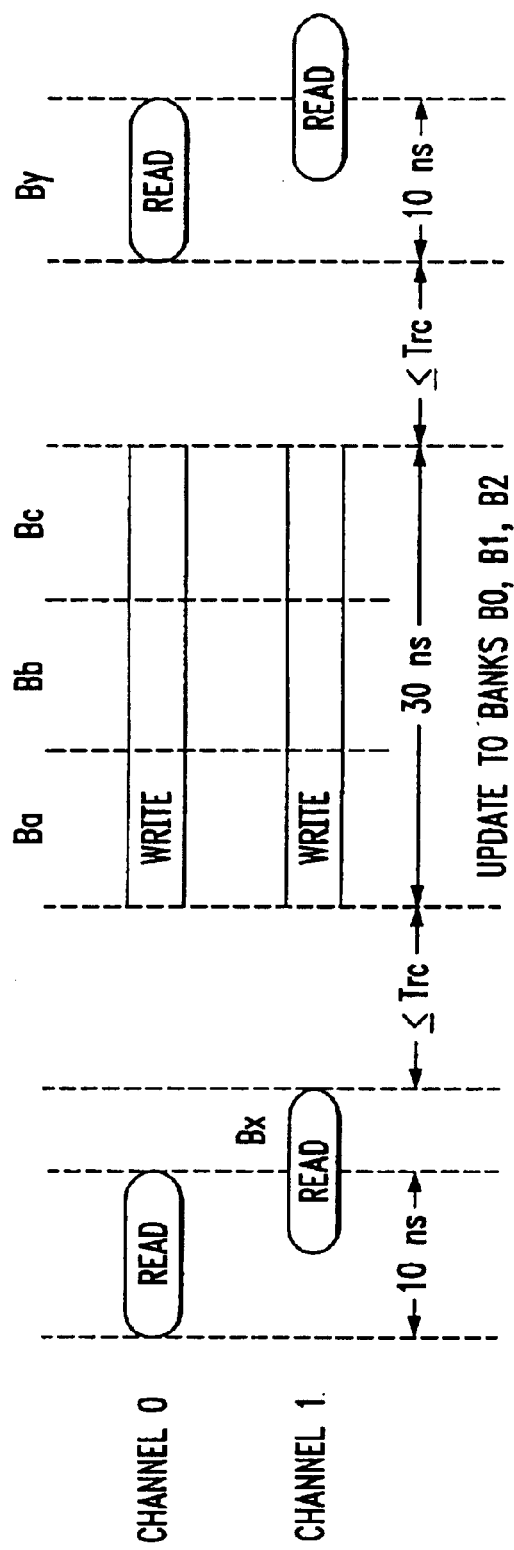
FIG. 4 is a timing diagram showing the processing of access requests in the two channels of the FIG. 1 system in an illustrative embodiment of the invention.

FIG. 4 is a timing diagram illustrating the processing of a number of different access requests, using the above-described bank conflict avoidance mode, in the two channels 102, 104 of the FIG. 1 system. It is again assumed that duplicate sets of data items are stored in each of the banks B0, B1 and B2 of each of Channel 0 and Channel 1, as described in conjunction with FIG. 2. In this example timing diagram, it can be seen that read access requests each take approximately 10 nanoseconds. This corresponds to the above-noted random bank access delay Trbd. The Channe10 and Channe11 banks are totally independent in this illustrative embodiment. A read access request for a particular bank in Channel 0 may therefore overlap with a read access request for a particular bank in Channel 1, as illustrated in the figure, although this type of staggering is by way of example only and not a requirement of the invention. The FIG. 4 timing diagram also shows 30 nanoseconds of write access requests that are used to update the contents of the banks B0, B1 and B2. The random cycle time Trc in this example is assumed to be 25 nanoseconds. It should be emphasized that the particular timing intervals shown in the figure are examples only.

A delay less than or equal to Trc is incurred before and after the example set of write access requests shown in FIG. 4. It should be noted in this regard that the memory system may include additional logic which reduces the actual wait time in a given embodiment. For example, such additional logic can be configured to determine the particular ordering of the write accesses to banks Ba, Bb and Bc in FIG. 4 based on the last read access (to bank Bx) before the update and the first read access (to bank By) after the update, where a, b, c, x and y may take on the values 0, 1 or 2 in this example.

Advantageously, the above-described illustrative embodiments of the invention can provide a maximum data throughput on the order of 10 Gbps or more. In this case, each channel may be configured to include 4 banks, with the same data items stored in three of the four banks as previously described. The DRAM devices may be the above-noted FCDRAM devices identified by part number TC59LM814CFT-50 and commercially available from Toshiba, operating in the four-burst mode, using a 200 MHz memory clock, with each of the banks including 4M memory words of 16 bits each. Other commercially available DRAM memory banks suitable for use in conjunction with the present invention include, by way of example and not limitation, part numbers TC59LM806CFT-50, TC59LM806BFT-22 and TC59LM814BFT-22 from Toshiba and part numbers MB81N251647-50 and MB81N25847-50 from Fujitsu, although the maximum achievable data throughput may vary depending upon the devices used.

The memory system 100 is preferably operable in multiple modes, including the above-described bank conflict avoidance mode, and at least one other mode. This other mode may be a conventional DRAM operating mode, in which the memory system 100 operates substantially as a conventional DRAM-based system and is therefore subject to the bank conflict penalty previously described. In this conventional DRAM operating mode, each of the banks B0, B1, . . . BN in each of the channels 102, 104 may store a different set of data items, and the data items may be accessed in a random manner. In other words, the specified bank access sequencing associated with the bank conflict avoidance mode is not used. Conventional DRAM operations that may be implemented in the system 100 are well-understood in the art, and are therefore not described in detail herein. It is also possible in the DRAM operating mode to utilize particular techniques for scheduling random accesses so as to minimize the impact of the bank conflict penalty. The particular operating mode of the system 100 may be selected under program control in a straightforward manner.

Figure 5:
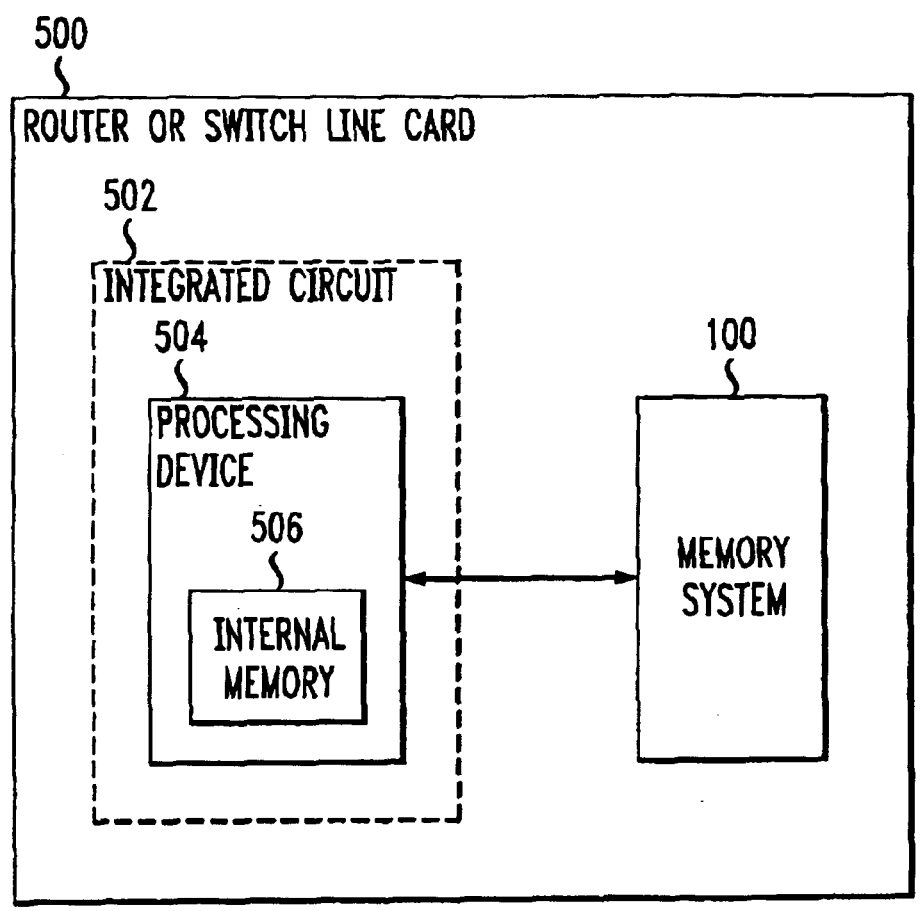
FIG. 5 illustrates the use of the memory system of FIG. 1 as an external memory for a processing device which includes an internal memory.

FIG. 5 shows an example processing system in which the memory system 100 may be implemented in accordance with the techniques of the invention. In this embodiment, the processing system comprises a line card 500 having an integrated circuit 502 installed thereon. The integrated circuit 502 comprises a processing device 504 having an internal memory 506. The processing device 504 interacts with an external memory on the line card 500. The external memory is the memory system 100 illustrated and described in conjunction with FIG. 1.

The processing system as shown in FIG. 5 is considerably simplified for clarity of illustration. It is to be appreciated, however, that the processing system may comprise a router or switch which includes multiple such line cards, and that each of the line cards may include multiple integrated circuits. Similar implementations of the invention may be based on one or more port cards of a router or switch.

The processing device 504, implemented as at least a portion of the integrated circuit 502, may comprise a network processor. As indicated above, the memory system 100 is particularly well-suited for use in memory applications in which there is an unbalanced read/write ratio, i.e., memory applications typically involving substantially more read accesses than write accesses. In such an application of the present invention, the memory system 100 may serve, e.g., as an external tree memory for the network processor integrated circuit. A tree memory is used in conjunction with a binary or non-binary tree search algorithm which attempts to determine the presence or absence of a match between a search object and a particular stored data item. An example of a non-binary tree search algorithm known in the art is described in U.S. Pat. No. 5,813,001 issued Sep. 22, 1998 to V. A. Bennett and entitled "Method for performing optimized intelligent searches of knowledge bases using submaps associated with search objects." Although well-suited for use in a tree memory application, the memory system 100 of the present invention can be utilized in numerous other applications and a wide variety of other processing system configurations. For example, the memory system 100 can be utilized as an internal memory in a network processor or other processing device.

The above-described embodiments of the invention are intended to be illustrative only. For example, as previously indicated, the present invention can be implemented using other configurations of memory system elements. In addition, the minimum number of memory banks required for storage of multiple copies of a given data item may be determined as another function of the random cycle time of the memory banks, the random bank access delay of the memory banks, or a combination of both. Furthermore, although the illustrative embodiments utilize two independent memory channels, each having data copies stored in a minimum of three memory banks, and with each bank storing the identical data items, it should be appreciated that other numbers of channels, banks per channel and distribution of data copies over the banks may be used. These and numerous other alternative embodiments within the scope of the following claims will be apparent to those skilled in the art.

What is claimed is:

1. A memory system comprising:
  a memory controller; and
  a plurality of memory banks operatively coupled to the memory controller, each of the memory banks configured for storing a plurality of data items, wherein a given data item is stored as multiple copies of the data item with the multiple copies being stored in respective ones of a designated minimum number of the memory banks;
  the memory controller being adapted to process requests for access to the data items stored in the memory banks in accordance with a specified bank access sequence configured to prevent bank conflict between the access requests;
  wherein the memory controller comprises:
    a set of queues configured for storing the access requests, each of the queues being associated with a corresponding one of the plurality of memory banks; and
    an arbiter operatively coupled to the set of queues for selecting a given one of the access requests therefrom in accordance with the specified bank access sequence.

2. The memory system of claim 1 wherein the minimum number of the memory banks for storage of the multiple copies of the given data item is determined as a function of a random cycle time of the memory banks.

3. The memory system of claim 1 wherein each of at least a subset of the plurality of memory banks is configured to store the same plurality of data items, the subset comprising at least two of the memory banks.

4. The memory system of claim 1 further comprising a first memory channel including the plurality of memory banks as a first plurality of memory banks and a second memory channel including a second plurality of memory banks.

5. The memory system of claim 4 wherein the memory controller further comprises a first controller coupled to each of the first plurality of memory banks via a first set of address, data and control buses, and a second controller coupled to each of the second plurality of memory banks via a second set of address, data and control buses.

6. The memory system of claim 1 wherein the specified bank access sequence comprises a round-robin selection sequence in which particular ones of the access requests are selected in a round-robin sequence from head positions of the sets of queues and applied to corresponding ones of the plurality of memory banks.

7. The memory system of claim 1 wherein each of at least a subset of the plurality of memory banks is implemented using one or more dynamic random access memory (DRAM) devices.

8. The memory system of claim 7 wherein one or more of the DRAM devices comprises a fast cycle DRAM (FCDRAM) device.

9. The memory system of claim 1 being operable in multiple modes, the multiple modes comprising at least:
  a first mode in which a given data item is stored as multiple copies of the data item with a given one of the multiple copies in each of a designated minimum number of the memory banks, and the memory controller is adapted to process requests for access to the data items stored in the memory banks in accordance with the specified bank access sequence; and
  a second mode in which the given data item is stored as a single copy of the data item with the single copy in a particular one of the plurality of memory banks, and the memory controller is adapted to process requests for access to the data items stored in the memory banks in accordance with a sequence other than the specified bank access sequence.

10. The memory system of claim 1 wherein the access requests comprise a plurality of read requests.

11. The memory system of claim 1 wherein the system processes the access requests in the form of a plurality of read requests and a plurality of write requests, the read requests and the write requests being in an unbalanced ratio favoring the read requests.

12. A memory system comprising:

a memory controller; and a plurality of memory banks operatively coupled to the memory controller, each of the memory banks configured for storm a plurality of data items, wherein a given data item is stored as multiple copies of the data item with the multiple copies being stored in respective ones of a designated minimum number of the memory banks;

the memory controller being adapted to process requests for access to the data items stored in the memory banks in accordance with a specified bank access sequence configured to prevent bank conflict between the access requests;

wherein the minimum number of the memory banks for storage of the multiple copies of the given data item is determined as a function of the random cycle time of the memory banks and a random bank access delay of the memory banks.

13. The memory system of claim 12 wherein the minimum number of the memory banks for storage of the multiple copies of the given data item is determined as an integer greater than or equal to a ratio of the random cycle time of the memory banks to the random bank access delay of the memory banks.

14. A processing system comprising:

a processing device; and a memory system operatively coupled to the processing device, the memory system comprising:

a memory controller; and a plurality of memory banks operatively coupled to the memory controller, each of the memory banks configured for storing a plurality of data items, wherein a given data item is stored as multiple copies of the data item with the multiple copies being stored in respective ones of a designated minimum number of the memory banks;

the memory controller being adapted to process requests received from the processing device for access to the data items stored in the memory banks in accordance with a specified bank access sequence configured to prevent bank conflict between the access requests;

wherein the memory controller comprises;

a set of queues configured for storing the access requests, each of the queues being associated with a corresponding one of the plurality of memory banks; and an arbiter operatively coupled to the set of queues for selecting a given one of the access requests therefrom in accordance with the specified bank access sequence.

15. The processing system of claim 14 wherein the processing device comprises a network processor.

16. The processing system of claim 15 wherein the memory system implements an external tree memory for the network processor.

17. A method for use in a memory system comprising a memory controller and a plurality of memory banks operatively coupled to the memory controller, each of the memory banks configured for storing a plurality of data items, the method comprising:

storing a given data item as multiple copies of the data item with the multiple copies being stored in respective ones of a designated minimum number of the memory banks; and processing in the memory controller requests for access to the data items stored in the memory banks in accordance with a specified bank access sequence configured to prevent bank conflict between the access requests;

wherein the memory controller comprises;

a set of queues configured for storing the access requests, each of the queues being associated with a corresponding one of the plurality of memory banks; and an arbiter operatively coupled to the set of queues for selecting a given one of the access requests therefrom in accordance with the specified bank access sequence.

18. A method for use in a memory system comprising a memory controller and a plurality of memory banks operatively coupled to the memory controller, each of the memory banks configured for storing a plurality of data items, the method comprising:

determining a minimum number of the memory banks for storage of multiple copies of a given data item as a function of a random cycle time of the memory banks; and storing the given data item as multiple copies of the data item with the multiple copies being stored in respective ones of the designated minimum number of the memory banks;

wherein the memory controller comprises:

a set of queues configured for storing the access requests, each of the queues being associated with a corresponding one of the plurality of memory banks; and an arbiter operatively coupled to the set of queues for selecting a given one of the access requests therefrom in accordance with the specified bank access sequence.

* * * * *

UNITED STATES PATENT AND TRADEMARK OFFICE
CERTIFICATE OF CORRECTION

PATENT NO.   : 6,944,731 B2
DATED        : September 13, 2005
INVENTOR(S)  : G.A. Bouchard et al.

It is certified that error appears in the above-identified patent and that said Letters Patent is hereby corrected as shown below:

Column 9,
Line 5, delete "storm" and insert -- storing --.

Signed and Sealed this

Twenty-fifth Day of October, 2005

JON W. DUDAS
*Director of the United States Patent and Trademark Office*